(12) United States Patent
Langholz

(10) Patent No.: US 9,391,933 B2
(45) Date of Patent: Jul. 12, 2016

(54) COMPOSING MESSAGES WITHIN A COMMUNICATION THREAD

(71) Applicant: Facebook, Inc., Menlo Park, CA (US)

(72) Inventor: Benjamin S. Langholz, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/311,758

(22) Filed: Jun. 23, 2014

(65) Prior Publication Data

US 2015/0312182 A1 Oct. 29, 2015

Related U.S. Application Data

(60) Provisional application No. 61/985,456, filed on Apr. 28, 2014.

(51) Int. Cl.
| | | |
|---|---|---|
| *G06F 3/0488* | (2013.01) | |
| *G06F 3/0481* | (2013.01) | |
| *G06F 3/0484* | (2013.01) | |
| *H04L 12/58* | (2006.01) | |
| *H04N 5/232* | (2006.01) | |

(Continued)

(52) U.S. Cl.
CPC .............. *H04L 51/04* (2013.01); *G06F 3/0481* (2013.01); *G06F 3/0482* (2013.01); *G06F 3/0488* (2013.01); *G06F 3/04842* (2013.01); *G06F 3/04847* (2013.01); *G06F 3/04886* (2013.01); *G06F 3/16* (2013.01); *H04L 51/02* (2013.01); *H04L 51/066* (2013.01); *H04L 51/10* (2013.01); *H04N 5/23216* (2013.01); *H04N 5/23293* (2013.01); *H04N 7/142* (2013.01); *G06F 2203/04803* (2013.01)

(58) Field of Classification Search
CPC ... G06F 3/05886; G06F 3/04842; G06F 3/16; G06F 3/0481; G06F 3/0488; G06F 3/0482; G06F 3/04847; G06F 2203/04803; H04L 51/02; H04L 51/04; H04L 51/66; H04L 51/10; H04N 5/23216; H04N 5/23293; H04N 7/142
See application file for complete search history.

(56) References Cited

U.S. PATENT DOCUMENTS 6,473,769 B1 * 10/2002 Andrew et al. ............... 707/610
2006/0215242 A1 9/2006 Besharat et al.

(Continued)

FOREIGN PATENT DOCUMENTS

| EP | 2582120 | 4/2013 |
|---|---|---|
| EP | 2712165 | 3/2014 |

OTHER PUBLICATIONS

U.S. Appl. No. 14/308,188, Jun. 18, 2014, Langholz.

(Continued)

*Primary Examiner* — Aaron Lowenberger
(74) *Attorney, Agent, or Firm* — Keller Jolley Preece

(57) ABSTRACT

One or more embodiments described herein include methods and systems of organizing a user interface of a communication system. More specifically, systems and methods described herein provide users the ability to easily and effectively compose an electronic communication directly in a communication thread, thus reducing user interface clutter. Additionally, systems and methods described herein selectively provide display elements within a messaging user interface according to the type of message a user is creating.

20 Claims, 11 Drawing Sheets

(51) Int. Cl.
*G06F 3/16* (2006.01)
*G06F 3/0482* (2013.01)
*H04N 7/14* (2006.01)

(56) References Cited

U.S. PATENT DOCUMENTS

| | | | |
|---|---|---|---|
| 2006/0223502 | A1 | 10/2006 | Doulton |
| 2007/0054678 | A1 | 3/2007 | Doulton |
| 2007/0136750 | A1 | 6/2007 | Abanami et al. |
| 2008/0119235 | A1 | 5/2008 | Nielsen et al. |
| 2009/0027480 | A1 | 1/2009 | Choi |
| 2009/0177981 | A1* | 7/2009 | Christie et al. ............... 715/758 |
| 2010/0267369 | A1 | 10/2010 | Lim et al. |
| 2011/0119619 | A1 | 5/2011 | Fong et al. |
| 2011/0276901 | A1* | 11/2011 | Zambetti et al. ............. 715/753 |
| 2012/0022865 | A1 | 1/2012 | Milstein |
| 2012/0190388 | A1 | 7/2012 | Castleman et al. |
| 2012/0269334 | A1 | 10/2012 | Goguen et al. |
| 2012/0317210 | A1 | 12/2012 | Fisher et al. |
| 2013/0091443 | A1 | 4/2013 | Park et al. |
| 2013/0093833 | A1 | 4/2013 | Al-Asaaed et al. |
| 2013/0120447 | A1 | 5/2013 | Kim et al. |
| 2013/0179800 | A1 | 7/2013 | Jeong et al. |
| 2013/0332870 | A1 | 12/2013 | Kim et al. |
| 2014/0085487 | A1 | 3/2014 | Park et al. |
| 2014/0118563 | A1 | 5/2014 | Mehta et al. |
| 2014/0253463 | A1 | 9/2014 | Hicks |
| 2014/0253522 | A1 | 9/2014 | Cueto |
| 2015/0040029 | A1* | 2/2015 | Koum et al. .................. 715/748 |
| 2015/0089389 | A1* | 3/2015 | Cohen-Zur et al. ........... 715/752 |

OTHER PUBLICATIONS

U.S. Appl. No. 14/312,481, Jun. 23, 2014, Langholz.
U.S. Appl. No. 14/314,623, Jun. 25, 2014, Langholz.
International Search Report as received in PCT/US2014/043703 dated Jan. 12, 2015.
International Search Report as received in PCT/US2014/044138 dated Jan. 12, 2015.
U.S. Appl. No. 14/314,623, Jul. 9, 2015, Office Action.
Extended European Search Report as received in EP14173880.7 dated Oct. 1, 2015.
Extended European Search Report as received in EP14173537.3 dated Oct. 5, 2015.
Apple: "Apple iPhone 4s running iOS version 7.0.6", Iphone 4S Running iOS 7, Sep. 2013.
XP55215941: "Illustration of features of the iMessage Software of iOS 7", as released withiOS7 by Apple on Sep. 18, 2013, pp. 1-11,[document created by the examiner on Sep. 24, 2015] [screen shots taken on Sep. 22, 2015].
XP055215944**: "The History of iOS", Sep. 1, 2013, Retrieved from the Internet: URL:http://chaione.comiwp-content/uploads/2013/09/history-of-ios-inographic-Final.png [retrieved on Sep. 24, 2015].
U.S. Appl. No. 14/314,623, Oct. 27, 2015, Office Action.
U.S. Appl. No. 14/308,188, May 9, 2016, Office Action.
U.S. Appl. No. 14/312,481, Mar. 29, 2016, Office Action.
U.S. Appl. No. 14/314,623, Mar. 14, 2016, Notice of Allowance.

* cited by examiner

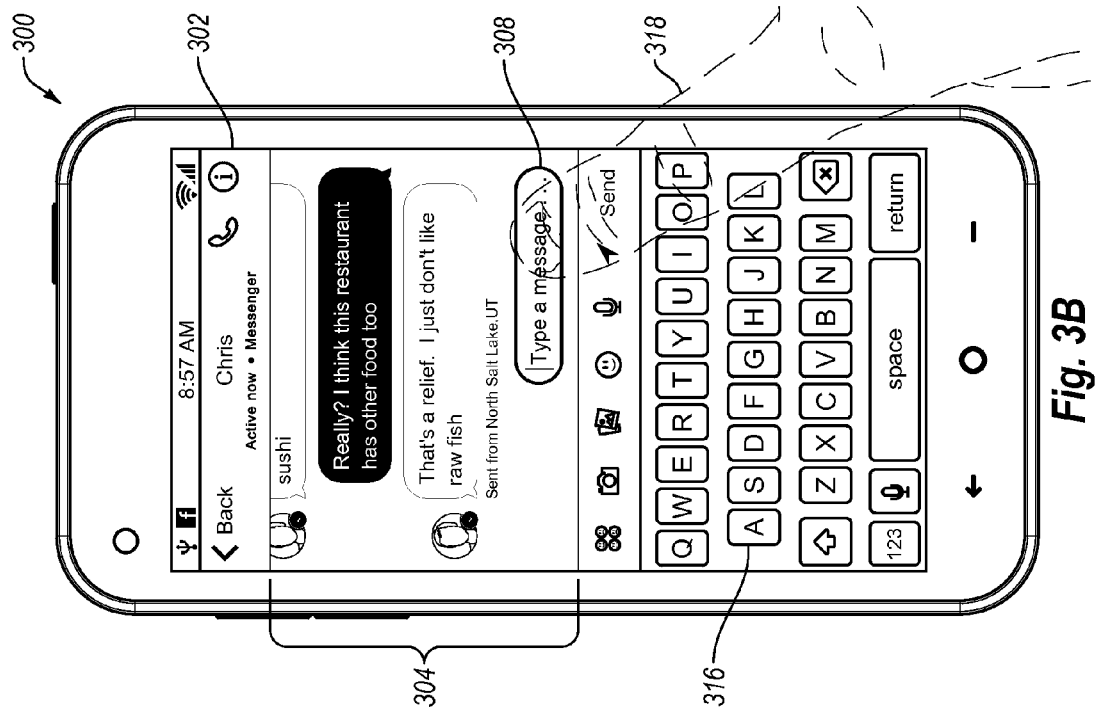
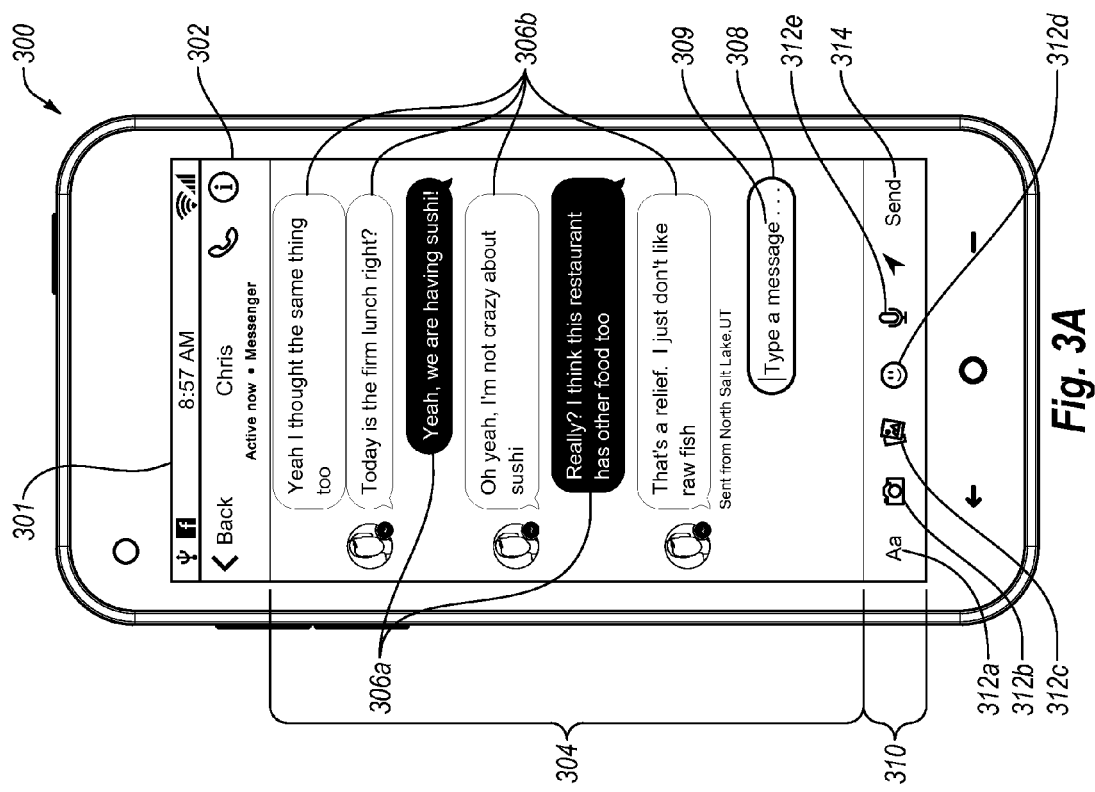
Fig. 3B
Fig. 3A

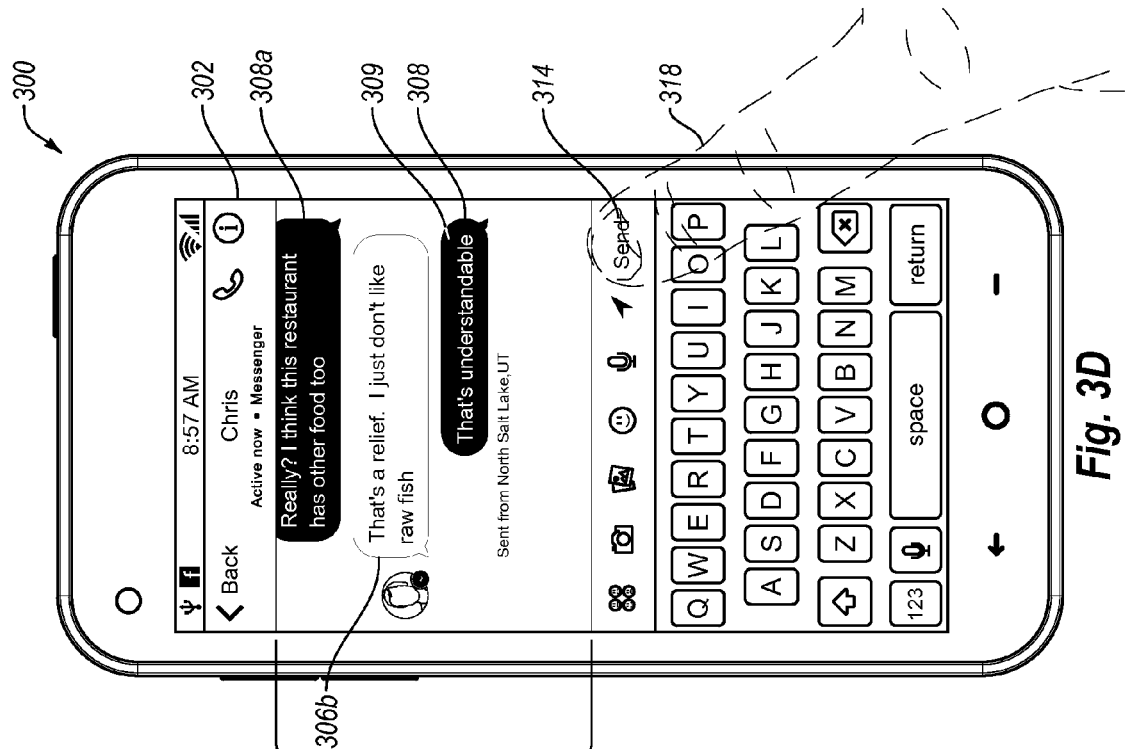
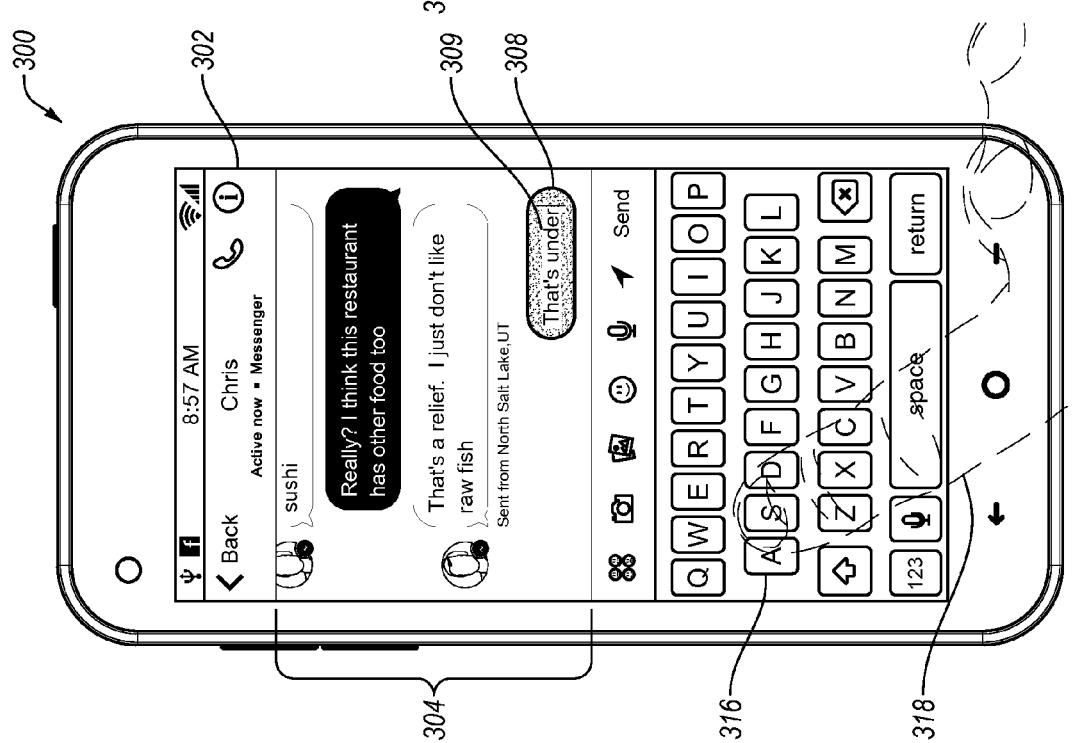
Fig. 3C
Fig. 3D

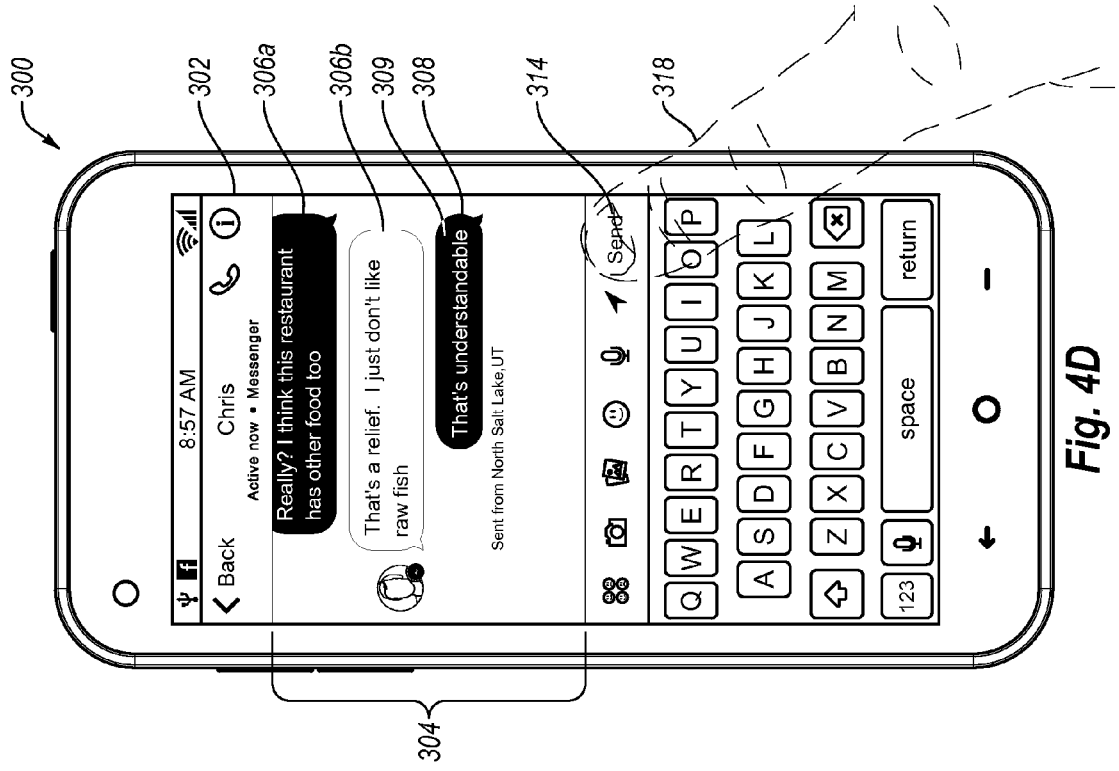
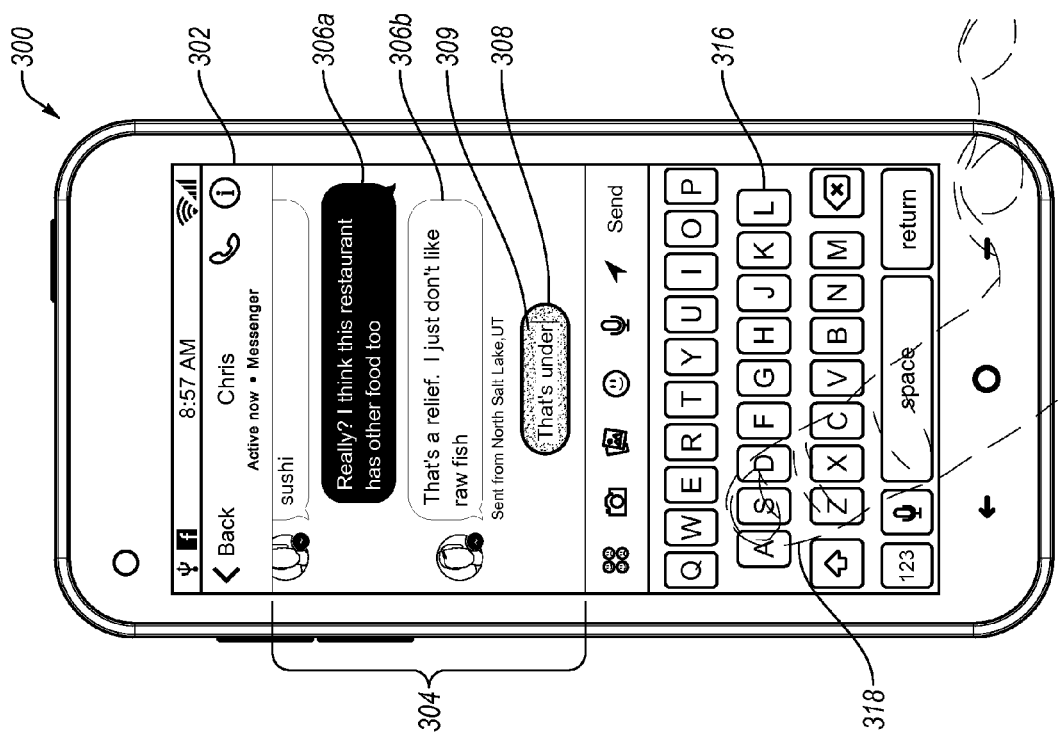
Fig. 4C
Fig. 4D

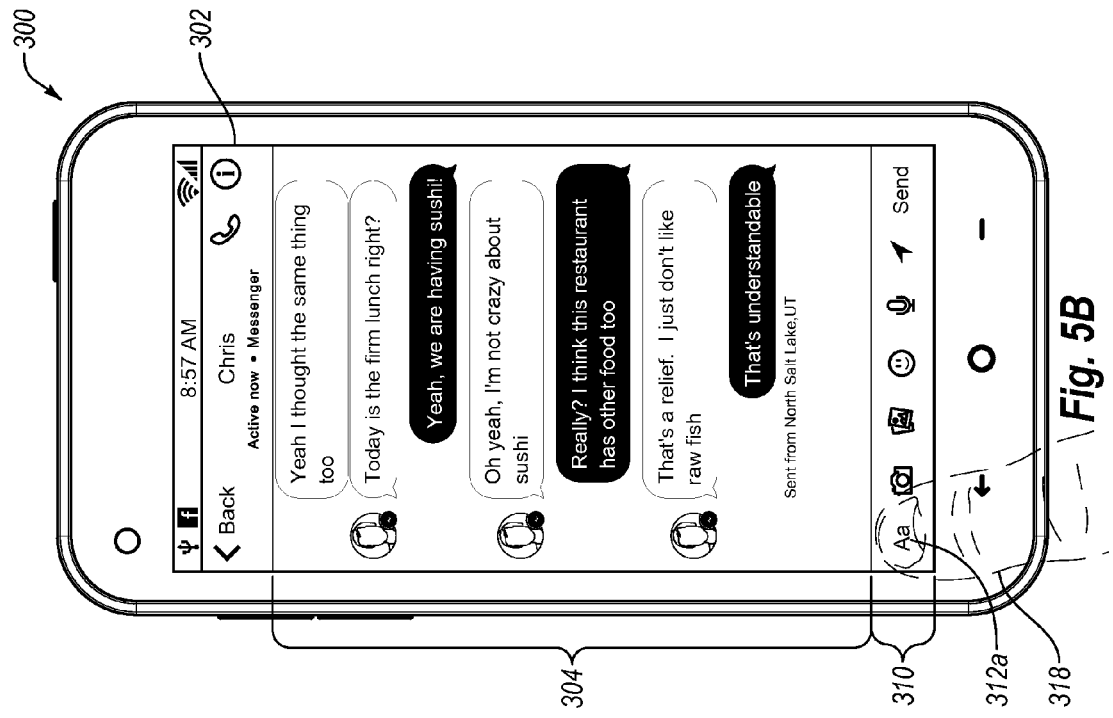
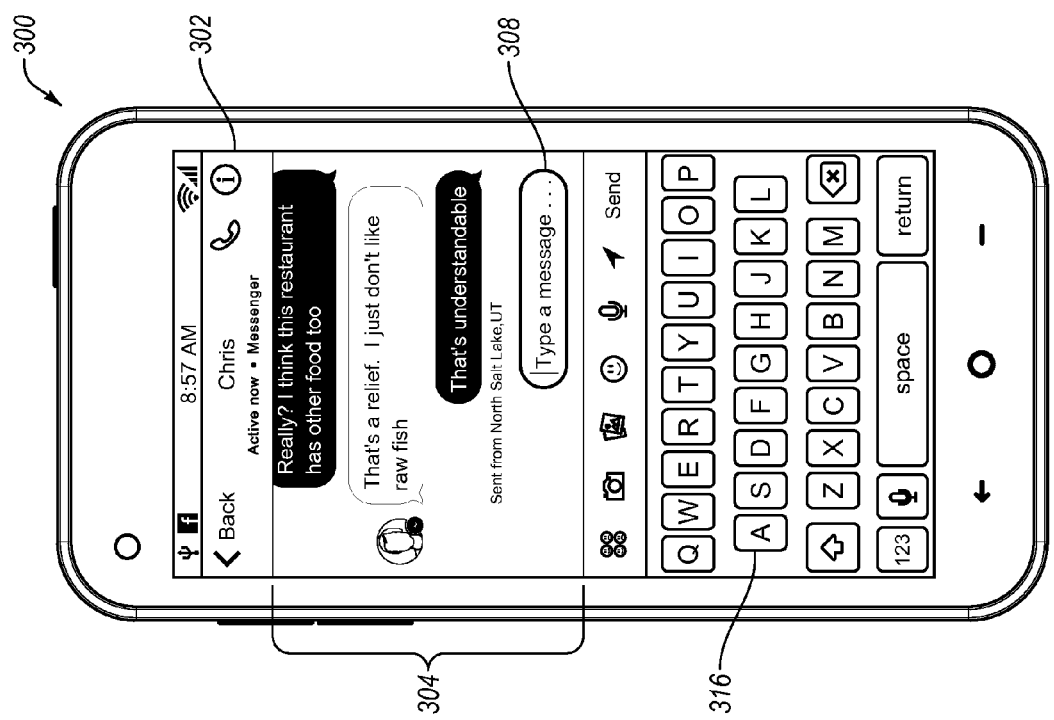

COMPOSING MESSAGES WITHIN A COMMUNICATION THREAD

CROSS REFERENCE TO RELATED APPLICATIONS

This application claims priority to and the benefit of U.S. Provisional Application No. 61/985,456 filed Apr. 28, 2014. The entire contents of the foregoing application are hereby incorporated by reference in their entirety.

BACKGROUND

1. Technical Field

One or more embodiments relate generally to electronic communication systems and methods. More specifically, one or more embodiments relate to systems and methods for increasing organization and functionality in an electronic communication system.

2. Background and Relevant Art

Computing devices (e.g., computers, tablets, and smart phones) provide numerous ways for people to connect and communicate with one another. For example, a variety of electronic communication systems provide various methods to send and receive electronic messages. For instance, a computing device can allow a user to communicate with other users using text messaging, instant messaging, social network posting, and other forms of electronic communication. In addition, an electronic communication may include a variety of content including text, images, video, and/or other data. In general, electronic communication has become a popular way for people to connect and communicate with one another.

Due to the wide variety of ways in which people can communicate using electronic communication systems, user interfaces associated with electronic communication systems tend to become cluttered. For example, a communication user interface may include a keyboard and a communication thread area, in addition to other display elements. When displayed on a smaller screen (i.e., the touch screen display of a handheld device), a user interface including various elements quickly becomes cluttered.

Furthermore, as a user interface includes more elements, the viewable portion of the communication thread usually shrinks in order to accommodate the additional elements. This is problematic because a user generally needs or desires to see the last several communications sent and received in order to understand the context of the communication session, as well as to remember where the communication session left off. Determining the context and content of a communication session is typically difficult if no more than a few lines of text are viewable within the communication thread.

Thus, there are several disadvantages to current methods of organizing user interfaces of electronic communication systems.

SUMMARY

One or more embodiments provide benefits and/or solve one or more of the foregoing or other problems in the art with methods and systems that provide enhanced features and organization for electronic communication systems. For example, methods and systems described herein allow users to easily and intuitively send and receive electronic communications. Furthermore, one or more embodiments can provide the foregoing or other benefits without cluttering a user interface of the electronic communication system.

For example, systems and methods of one or more embodiments allow a user to compose a message directly into a communication thread. By composing messages directly a communication thread, one or more embodiments allow a user to view a greater portion of a communication thread. Thus, one or more embodiments allow the user a greater opportunity to determine the context and content of a communication session.

Furthermore, systems and methods of one or more embodiments reduce user interface clutter by selectively providing various display elements. For example, one or more embodiments provide certain display elements when applicable and remove other display elements when inapplicable. For example, one or more embodiments can remove a message input element and touch screen display keyboard when a user is not composing a textual message. Thus, one or more embodiments reduce user interface clutter by selectively adding and removing various display elements.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of various embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting, these embodiments will be described and explained with additional specificity and detail through the use of the accompanying drawings in which:

FIGS. 3A-3D illustrate user interfaces for composing electronic communications directly in a communication thread in accordance with one or more embodiments;

FIGS. 4A-4D illustrate additional user interfaces for composing electronic communications directly in a communication thread in accordance with one or more additional embodiments;

FIGS. 5A-5B illustrate additional user interfaces for composing electronic communications directly in a communication thread in accordance with one or more additional embodiments;

DETAILED DESCRIPTION

One or more embodiments include a user interface organization system that provides users with efficient and effective user experiences when composing electronic messages. In an exemplary embodiment, the user interface organization system can enter user input as textual message directly into a communication thread. For example, as a user begins typing, the user interface organization system can add the user input to a message input element within the communication thread. Once the user sends the message, the user interface organization system can change the appearance of the message input element to signal that the message has been sent. By allowing for composition of messages directly in a communication thread, the user interface organization system can allow the user a greater opportunity to determine the context and content of a communication session.

Furthermore, the user interface organization system can reduce user interface clutter by selectively providing or removing various display elements. For example, one or more embodiments provide certain display elements when applicable and remove other display elements when inapplicable. In particular, when the user begins entering a message, the user interface organization system can provide a message input element within the communication thread. Alternatively, the communication thread can include a message input element by default. Once the user indicates by one or more action that they are not going to enter a message, the user interface organization system can remove the message input element from the communication thread.

Thus, one or more embodiments described herein allow users to easily and intuitively compose, send, and receive electronic communications. In particular, systems and methods described herein allow users to compose electronic messages such that the viewable area of a communication thread of an electronic communication session is maximized or otherwise optimized. For example, one or more embodiments allow a user a greater opportunity to determine the context and content of a communication session via a larger viewable area of the communication thread containing electronic messages.

Figure 1:
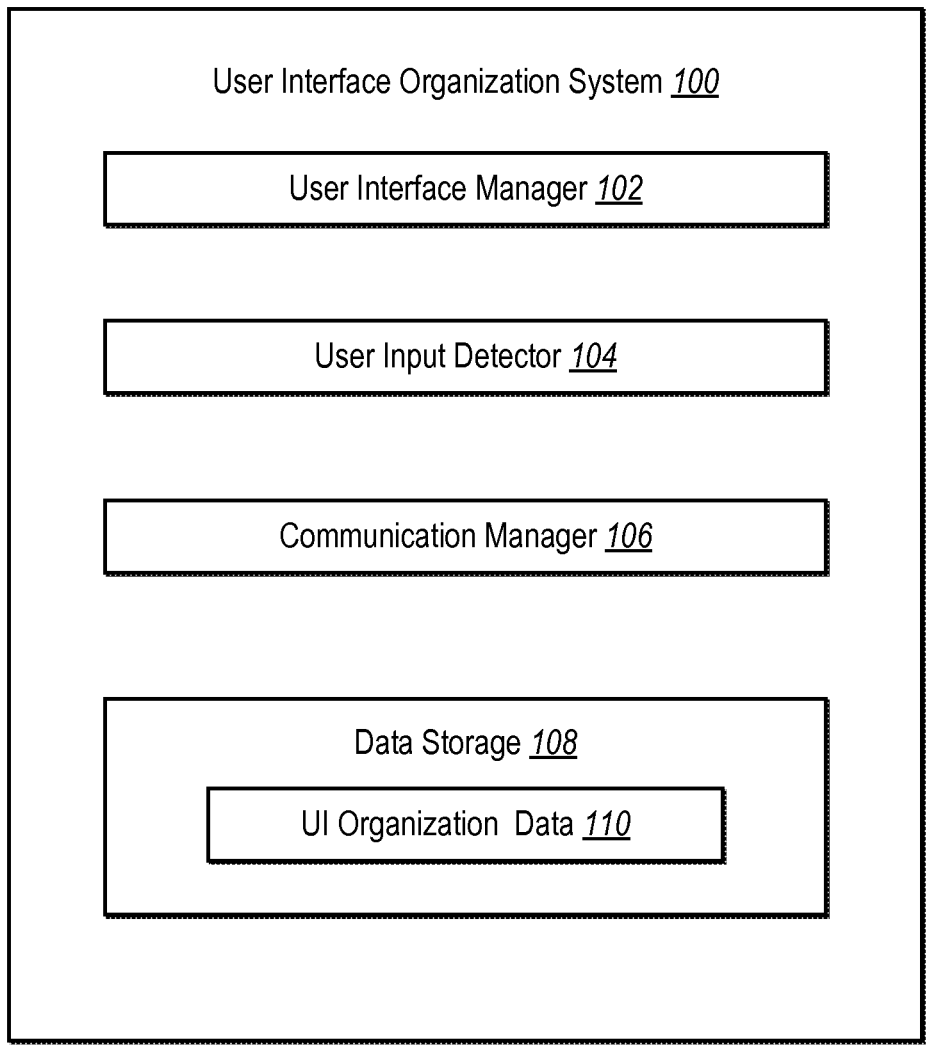
FIG. 1 illustrates a schematic diagram of a user interface organization system in accordance with one or more embodiments.

FIG. 1 illustrates an example embodiment of a user interface organization system 100 (or simply "UI organization system"). As shown, UI organization system 100 may include, but is not limited to, a user interface manager 102 (or simply "UI manager"), a user input detector 104, a communication manager 106, and a data storage 108. Each of the components 102-108 of the UI organization system 100 may be in communication with one another using any suitable communication technologies. One will appreciate in light of the disclosure herein that although the components 102-108 are shown to be separate in FIG. 1, any of the components 102-108 may be combined into fewer components, such as into a single facility or module, or divided into more components as may serve a particular embodiment. In addition, the components 102-108 may be located on, or implemented by, one or more computing devices, such as those described below in relation to FIG. 8. Alternatively, portions of the UI organization system 100 can be located on a computing device, while other portions of the UI organization system 100 are located on, or form part of, a social networking system, such as that described below in reference to FIG. 9.

The components 102-108 can comprise software, hardware, or both. For example, the components 102-108 can comprise one or more instructions stored on a computer readable storage medium and executable by processor of one or more computing devices. When executed by the one or more processors, the computer-executable instructions of the UI organization system 100 can cause a computing device(s) to perform the methods described herein. Alternatively, the components 102-108 can comprise hardware, such as a special purpose processing device to perform a certain function or group of functions. Additionally or alternatively, the components 102-108 can comprise a combination of computer-executable instructions and hardware.

As mentioned above, and as shown in FIG. 1, the UI organization system 100 can include a user interface manager 102. The user interface manager 102 provides, manages, updates, and/or controls graphical user interfaces (or simply "user interfaces") that allow a user to view and interact with display elements. For example, the user interface manager 102 may identify, display, update, or otherwise provide various user interfaces that contain one or more display elements in various layouts.

More specifically, the user interface manager 102 can provide a variety of display elements within a graphical user interface. For instance, example display elements include, but are not limited to: buttons, text boxes, menus, thumbnails, scroll bars, hyperlinks, etc. In one or more embodiments, the user interface manager 102 can display and format display elements in any one or a variety of layouts.

Furthermore, the user interface manager 102 can also update, remove, resize, or reposition display elements in response to user interactions. For example, as will be described in more detail below, the UI organization system 100 may detect user input in a variety of ways. For instance, in one or more embodiments, the detected user input may cause the user interface manager 102 to update a graphical user interface based on the detected input. Similarly, in one or more embodiments, the detected user input may cause the user interface manager 102 to resize one or more display elements, to reposition one or more display elements within the graphical user interface, or to otherwise change or remove one or more display elements within the graphical user interface.

Additionally, the user interface manager 102 can selectively update certain areas of a user interface in response to user interactions. For example, in one or more embodiments, detected user input may cause the user interface manager 102 to update or change within one area of a graphical user interface. In a particular embodiment, upon a detected user interaction, the user interface manager 102 may update one area within a user interface from one type of display to a second type of display, while continuing to display another area within the user interface with no updates.

As mentioned above, and as illustrated in FIG. 1, the UI organization system 100 may further include a user input detector 104. The user input detector 104 detects, receives, and/or facilitates user input in any suitable manner. In some examples, the user input detector 104 detects one or more user interactions. As referred to herein, a "user interaction" means a single input, a combination of inputs, received from a user by way of one or more input devices, or via one or more touch gestures as described above. A user interaction can have variable duration and may take place anywhere on the graphical user interface managed by the user interface manager 102 described above.

For example, the user input detector 104 can detect a user interaction from a keyboard, mouse, touch screen display, or any other input device. In the event a touch screen display is utilized, the user input detector 104 can detect one or more touch gestures that form a user interaction (e.g., tap gestures, swipe gestures, pinch gestures, etc.) provided by a user by way of the touch screen. In some examples, the user input detector 104 can detect touch gestures in relation to and/or directed at one or more display elements displayed as part of the graphical user interface presented on the touch screen display.

The user input detector 104 may additionally, or alternatively, receive data representative of a user interaction. For example, the user input detector 104 may receive one or more user configurable parameters from a user, one or more user commands from the user, and/or any other suitable user input. For example, the user input detector 104 can receive voice commands or otherwise sense, detect, or receive user input.

As mentioned above, and as illustrated in FIG. 1, the UI organization system 100 may further include a communication manager 106. The communication manager 106 can facilitate receiving and sending data to and from the UI organization system 100, or a device upon which the UI organization system 100 is implemented. In particular, the communication manager 106 can instruct or activate one or more communication interfaces of a computing device, as described below to send or receive data. Furthermore, the communication manager 106 can package or format content items to be sent or received from the UI organization system 100 in any necessary form that is able to be sent through one or more communication channels and using an appropriate communication protocol, as described further below with reference to FIG. 8.

As discussed above, the UI organization system 100 can include a data storage 108, as illustrated in FIG. 1. The data storage 108 may maintain UI organization data 110 representative of data associated how the user interface manager 102 organizes a user interface. For example, the UI organization data 110 can include current and previous user interface organization, user interface layouts, display element placement and configuration, and other similar type data that the UI organization system 100 may use in connection with organizing user interfaces of a communication system.

Figure 2:
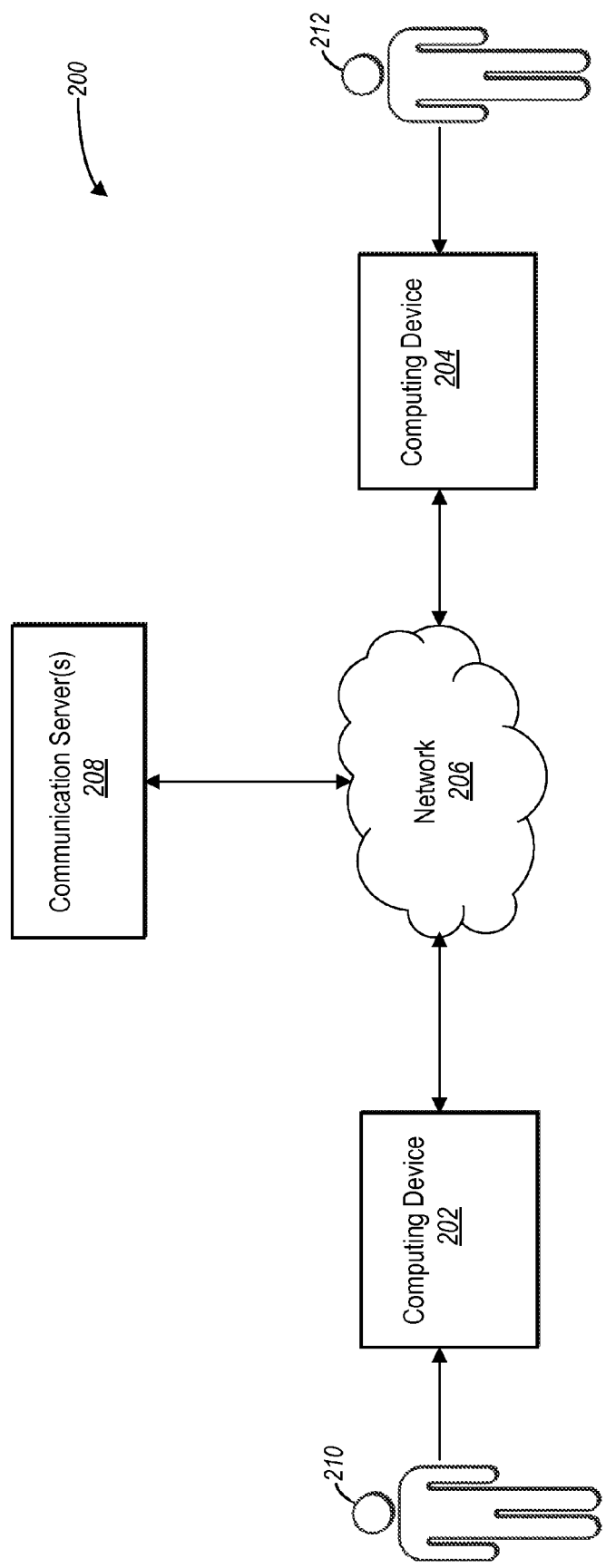
FIG. 2 illustrates a block diagram of an exemplary environment for implementing the system of FIG. 1 in accordance with one or more embodiments.

FIG. 2 is a schematic diagram illustrating an example a system 200, within which one or more embodiments of the UI organization system 100 can be implemented. As illustrated in FIG. 2, the system 200 can include computing devices 202, 204, a network 206, and a communication server 208. The computing devices 202, 204, the network 206, and the communication server 208 may be communicatively coupled, as shown in FIG. 2. Although FIG. 2 illustrates a particular arrangement of the computing devices 202, 204, the network 206, and the communication server 208, various additional arrangements are possible. For example, the computing devices 202, 204 may directly communicate with the communication server 208, bypassing the network 206, or alternatively, may directly communicate with each other.

The computing devices 202, 204, the network 206, and the communication server 208 may communicate using any communication platforms and technologies suitable for transporting data and/or communication signals. For example, the computing devices 202, 204, the network 206, and the communication server 208 may communicate via any known communication technologies, devices, media, and protocols supportive of remote data communications, examples of which will be described in more detail below with respect to FIG. 8. In addition, in certain embodiments, the computing devices 202, 204, and the communication server 208 may communicate via the network 206, which may include one or more social networks as described further below with respect to FIG. 9.

The communication server 208 may generate, store, receive, and transmit electronic communication data. For example, the communication server 208 may receive an electronic communication from the computing device 202 and send the received electronic communication to the computing device 204. In particular, the communication server 208 can transmit electronic messages between one or more users of the system 200. The communication server 208 can receive a wide range of electronic communication types, including but not limited to, text messages, instant messages, social-networking messages, social-networking posts, emails, and any other form of electronic communication. Additional details regarding the communication server 208 will be discussed below with respect to FIG. 9.

The network 206 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 206 may be any suitable network over which the computing device 202 may access the communication server 208 and/or the computing device 204, or vice versa. The network 206 will be discussed in more detail below with regard to FIGS. 8 and 9.

In addition to the system and network elements of the system 200, FIG. 2 illustrates that a user 210 can be associated with the computing device 202, and that a user 212 can be associated with the computing device 204. Although FIG. 2 illustrates two users 210, 212, the system 200 can include a large number of users, with each of the users interacting with the system 200 through a corresponding number of computing devices. For example, the user 210 can interact with the computing device 202 for the purpose of composing, via the user input detector 104, and sending, via the communication manager 106, an electronic communication. The user 210 may interact with the computing device 202 by way of a user interface, managed by the user interface manager 102, on the computing device 202. For example, the user 210 can utilize the user interface to cause the computing device 202 to compose and send an electronic communication to one or more of the plurality of users of the system 200.

In one or more embodiments, the components 102-108, as described with regard to FIG. 1, may be implemented on one or more of the computing devices 202, 204 and the communication server 208. For example, the computing devices 202, 204, and the communication server 208 may communicate across the network 206 via the communication manager 106 of the UI organization system 100. In one or more embodiments, the computing devices 202, 204 may receive user inputs via the user input detector 104. Likewise, in one or more embodiments, the computing devices 202, 204 may provide graphical user interfaces via the user interface manager 102.

As will be described in more detail below, each of the components 100-108 of the UI organization system 100 as described with regard to FIGS. 1 and 2, can provide, alone and/or in combination with the other components of the UI organization system 100, one or more graphical user interfaces. In particular, the components 102-108 can allow a user to interact with a collection of display elements for a variety of purposes. In particular, FIGS. 3A-4E and the description that follows illustrate various example embodiments of the user interfaces and features that are in accordance with general principles as described above.

In some examples, a computing device (i.e., computing device 202, 204 of FIG. 2) can implement part or all of the UI organization system 100. For example, FIG. 3A illustrates a computing device 300 that may implement one or more the components 102-108 of the UI organization system 100. As illustrated in FIG. 3A, the computing device 300 is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, a handheld device, larger wireless devices, a laptop or desktop computer, a personal-digital assistant device, and/or any other suitable computing device can perform one or more of the processes and/or operations described herein.

The computing device 300 can include any of the features and components described below in reference to a computing device 800 of FIG. 8. As illustrated in FIG. 3A, the computing device 300 includes a touch screen display 301 that can display or provide user interfaces and by way of which user input may be received and/or detected. As used herein, a "touch screen display" refers to the display of a touch screen device. In one or more embodiments, a touch screen device may be the computing device 202, 204 with at least one surface upon which a user 210, 212 may perform touch gestures (e.g., a laptop, a tablet computer, a personal digital assistant, a media player, a mobile phone). Additionally or alternatively, the computing device 300 may include any other suitable input device, such as a touch pad or those described below in reference to FIG. 8.

FIG. 3A illustrates a touch screen display 301 of the computing device 300 displaying one embodiment of a graphical user interface, in particular a messaging graphical user interface 302. For example, the user interface manager 102 provides various display areas and display elements as part of the messaging graphical user interface 302. In one or more embodiments, the user interface manager 102 provides a communication thread 304, as well as a message input control palette 310.

As described above, the communication manager 106 of the UI organization system 100 can facilitate receiving and sending data. In one or more embodiments, the communication manager 106 facilitates receiving and sending electronic communications between the computing devices 202, 204. Also in one or more embodiments, the user interface manager 102 displays electronic communications sent and received via the communication manager 106. In a particular embodiment, the user interface manager 102 can display electronic communications sent and received via the communication manager 106 in the communication thread 304 within the messaging graphical user interface 302.

For example, as illustrated in FIG. 3A, the user interface manager 102 provides the communication thread 304 that includes electronic communications 306a, 306b sent and received by the communication manager 106. In one or more embodiments, the user interface manager 102 organizes the communication thread 304 such that newest messages are added to the bottom of the thread with oldest messages displayed at the top of the thread. In alternative embodiments, the user interface manager 102 may be organized in any manner that may indicate to a user the chronological relationship between the displayed messages. As shown, the electronic communications 306a are messages sent by the communication manager 106, and the electronic communications 306b are messages received by the communication manager 106. In one or more embodiments, the electronic communications 306a are composed by a user on the computing device 300 and sent to one or more co-users by the communication manager 106, while the communication manager 106 receives the electronic communications 306b at the computing device 300 from the one or more co-users.

The user interface manager 102 provides a variety of electronic communication characteristics to help a user distinguish between electronic communications displayed in the communication thread 304. For example, as illustrated in FIG. 3A, the user interface manager 102 displays the electronic communications 306a sent from the communication manager 106 pointed toward one side of the messaging graphical user interface 302. On the other hand, the user interface manager 102 displays the electronic communications 306b received by the communication manager 106 pointed toward the opposite side of the messaging graphical user interface 302. In one or more embodiments, this positioning and orientation of the electronic communications 306a, 306b provides a clear indicator to a user of the computing device 300 of the origin of the various electronic communications displayed within the messaging graphical user interface 302.

Another electronic communication characteristic provided by the user interface manager 102 that helps a user distinguish electronic communications may be a color of the electronic communication. For example, as shown in FIG. 3A, the user interface manager 102 displays the electronic communications 306a sent by the communication manager 106 in a first color, and displays the electronic communications 306b received by the communication manager 106 in a second color. In one or more embodiments, the first and second colors may be black and white, respectively, with an inverted typeface color, or may be any other color. In an alternative embodiment, the user interface manager 102 may display the electronic communications 306a, 306b with white backgrounds and different colored outlines.

In yet another alternative embodiment, the user interface manager 102 may display the electronic communications 306a, 306b with backgrounds of different patterns, in different fonts, in different sizes or in any other manner that may distinguish the electronic communications 306a from the electronic communications 306b. For example, in a particular embodiment, the user interface manager 102 displays electronic communications 306a with white typeface on a blue background. Likewise, in a particular embodiment, the user interface manager 102 displays electronic communications 306a with black typeface on a grey background.

As mentioned above, the user interface manager 102 may also provide a message input control palette 310. As illustrated in FIG. 3A, the user interface manager 102 displays the message input control palette 310 as part of the messaging graphical user interface 302. In one or more embodiments, the message input control palette 310 includes a variety of selectable message input controls that provide a user with various message input options or other options. For example, in FIG. 3A, the message input control palette 310 includes a text input control 312a, a photo input control 312b, a file input control 312c, a symbol input control 312d, and a recording input control 312e. In one or more alternative embodiments, the message input control palette 310 may provide the input controls 312a-312e in a different order, or may provide other input controls not displayed in FIG. 3A.

As will be described below in greater detail, a user may interact with any of the input controls 312a-312e in order to add different types of electronic communications to the communication thread 304. For example, in one or more embodiments, if a user interacts with the text input control 312a, the user interface manager 102 may provide a touch screen display keyboard in a portion of the messaging graphical user interface 302 that the user may utilize to compose a textual message. Similarly, in one or more embodiments, if a user interacts with the photo input control 312b, the user interface manager 102 may provide a digital camera interface within a portion of the massaging graphical user interface 302 that the user may utilize to add a photo to the communication thread 304. Likewise, in one or more embodiments, if a user interacts with the file input control 312c, the user interface manager 102 may provide a gallery of multimedia files (e.g., digital photographs, digital videos) within a portion of the messaging graphical user interface 302 from which a user may select a multimedia file for inclusion in the communication thread 304. Additionally, in one or more embodiments, if a user interacts with the symbol input control 312d, the user interface manager 102 may provide a gallery of symbols (e.g., emoticons, stickers, icons) within a portion of the messaging graphical user interface 302 from which a user may select a symbol for inclusion in the communication thread 304. Also in one or more embodiments, if a user interacts with the recording input control 312e, the user interface manager 102 may provide a recording control by way of which the user can record a message for inclusion in the communication thread 304.

The message input control palette 310 may also include a send element 314. For example, in FIG. 3A the message input control palette 310 includes the send element 314 along with the input controls 312a-312e. In one or more embodiments, the communication manager 106 may send an electronic communication to one or more co-users in response to a detected user interaction with the send element 314. Likewise, the user interface manager 102 may add the electronic communication to the communication thread 304 in response to the detected user interaction with the send element 314. For instance, in a particular embodiment, the user input detector 104 may detect a user touch gesture performed in conjunction with the send element 314. The user input detector 104 may report the detected touch gesture to the communication manager 106, which in turn can send an electronic message to one or more co-users via the server. Likewise, the user input detector 104 may report the detected touch gesture to the user interface manager 102, which in turn can add the electronic message to the communication thread 304.

The user interface manager 102 may also provide a message input element. For example, in FIG. 3A, the user interface manager 102 provides the message input element 308 within the communication thread 304 of the messaging graphical user interface 302. In one or more embodiments, the message input element 308 is a display element that may be interacted with by a user. For instance, in one or more embodiments, the message input element 308 may be selectable. Additionally, as will be described in more detail below, in one or more embodiments a user may compose a message input 309 directly into the message input element 308.

Allowing a user to compose a message input 309 directly into the message input element 308 within the communication thread 304 is advantageous for several reasons. First, it eliminates the need for the text input box common to most communication systems, which tends to add clutter and take up space within a messaging graphical user interface. Also, it is more intuitive for a user to be able to compose a message input 309 directly within the communication thread 304. Specifically, utilizing the methods and systems described herein, a user may know exactly how a message input 309 will appear in the communication thread 304 once it is sent to one or more co-users.

In the embodiment shown in FIG. 3A, the message input element 308 displays a message input 309, "Type a message . . . " by default. In one or more embodiments, the message input element 308 may display another default message input 309. As used herein, a "message input" is a textual message either displayed by default within the message input element 308 or composed by a user within the message input element 308. In a particular embodiment, the user interface manager 102 clears the message input 309 upon a detected user interaction with the message input element 308, allowing a user to compose a custom message input within the message input element 308. In one or more alternative embodiments, the message input element 308 may also include a cursor 319, indicating that a user may be typing a message.

Also as shown in FIG. 3A, the user interface manager 102 may display the message input element 308 such that the message input element 308 has one or more different characteristics than the electronic communications 306a, 306b. For example, in one or more embodiments, the user interface manager 102 may provide the message input element 308 in a different shape than the electronic communications 306a, 306b. Alternatively, in one or more embodiments, the user interface manager 102 may provide the message input element 308 with a thicker border, in a different color, or with a different background than the electronic communications 306a, 306b. In one or more embodiments, the user interface manager 102 may also display the message input 309 in a different color, font, or size than the text of the electronic communications 306a, 306b. Additionally, the user interface manager 102 may display the message input element 308 with or, as shown in FIG. 3A, without the side-notch that is commonly associated with "message bubbles."

The process for composing the message input 309 within the message input element 308 will now be described with reference to FIGS. 3A-3D. As shown in FIG. 3A, upon initialization of the messaging graphical user interface 302, the user interface manager 102 displays the communication thread 304 including the electronic communications 306a, 306b, the message input element 308. A user may begin composing a message by interacting with message input element 308. For example, as illustrated in FIG. 3B, a finger 318 of a user's hand may interact with the message input element 308 such as via a touch gesture. In alternative embodiments, the finger 318 may perform other types of touch gestures in order to interact with the message input element 308, such as but not limited to a press-and-hold touch gesture, a double-tap gesture, or any other touch gesture suitable for this purpose. In any event, the user input detector 104 can detect a user interaction with the message input element 308.

As illustrated in FIG. 3B, in response to a detected touch gesture, the user interface manager 102 provides a touch screen display keyboard 316 within a portion of the messaging graphical user interface 302. In one or more embodiments, the user input detector 104 detects a touch gesture performed by the finger 318 in conjunction with the message input element 308 displayed within the communication thread 304, and reports the detected touch gesture to the user interface manager 102. In a particular embodiment, the user interface manager 102 provides the touch screen display keyboard 316 in response to the detected touch gesture. In alternative embodiments, the user interface manager 102 may provide the touch screen display keyboard 316 in response to other types of detected user input, such as a spoken command or change in the orientation of the computing device 300 (i.e., from portrait to landscape).

Once the user interface manager 102 updates the messaging graphical user interface 302 to include the touch screen display keyboard 316, the user may begin composing a message input. For example, as illustrated in FIG. 3C, the finger 318 of the user's hand may type a message input using the touch screen display keyboard 316. Alternatively, the user can use a voice to text option to begin entering a message.

In one or more embodiments, the user input detector 104 reports the detected user input to the user interface manager 102. In a particular embodiment, the user interface manager 102 updates the message input element 308 to display each letter of the message input 309 as the user input detector 104 detects or receives the user input. Thus, in one or more embodiments, the user interface manager 102 can continually update the message input element 308 such that the message input element 308 constantly resizes to accommodate each new letter of the message input 309 inputted by a user. Additionally, the user interface manager 102 can continually update the message input element 308 such that the message input element 308 expands to include two or more lines of text for longer messages.

As shown in FIG. 3C, the message input element 308 contains a partial message input 309. For example, the message input element 308 is approximately as wide as the message input 309, which reads, "That's under". In one or more embodiments, the user interface manager 102 may expand the message input element 308 as the finger 318 types another letter to add to the message input 309. In this way, the message input element 308 continually expands to accommodate the message input 309. In alternative embodiments, the message input element 308 may have a fixed width that does not expand, or may expand vertically to accommodate non-western writing formats.

The user interface manager 102 may change one or more characteristics of the message input element 308 in order to indicate a textual message is in the process of being composed. For example, as shown in FIG. 3C, the user interface manager 102 displays the message input element 308 with a different background than displayed in FIGS. 3A-3B. In one or more alternative embodiments, the user interface manager 102 may change the border of the message input element 308 while a user is composing a textual message within the message input element 308. In yet other alternative embodiments, the user interface manager 102 may change another characteristic of the message input element 308 such as, but not limited to, changing the color of the message input 309 displayed within the message input element 308, playing a sound while the message input 309 is composed, or any other characteristic change suitable for this purpose. For example, in a particular embodiment, the user interface manager 102 may change the typeface color, the font, or the text size of the message input 309 while the user is composing a textual message within the message input element 308.

Once a user is finished composing the message input 309 within the message input element 308, the UI organization system 100 can send the message input 309 to one or more co-users. For example, as shown in FIG. 3D, a user initiates sending of the message input 309 by using the finger 318 to interact with the send element 314. In one or more embodiments, once the user input detector 104 detects the user interaction with the send element 314, the communication manager 106 can send the message input 309 composed within the message input element 308 (as shown in FIG. 3C) to one or more co-users. In alternative embodiments, a user may initiate sending the message input 309 in various ways. For example, in an alternative embodiment, a user may initiate sending the message input 309 by giving a voice command, by tapping a "return" key or "enter" key, by shaking or tilting the computing device 300, or by any other way that may be suitable for initiating a send event.

Upon a detected tap touch gesture in conjunction with the send element 314 via the finger 318, as shown in FIG. 3D, the user interface manager 102 can change certain characteristics of the message input element 308 in the communication thread 304 to reflect that the message input has been sent as a message. For example, as shown in FIG. 3D, the message input 309 reads, "That's understandable", rather than the partial, "That's under" as displayed in FIG. 3C. In one or more embodiments, the user interface manager 102 may change the position of the message input element 308, the border width of the message input element 308, the background color of the message input element 308, the size and font of the message input 309 within the message input element 308, or any other characteristic of the message input element 308 suitable for this purpose. For example, in FIG. 3D after the detected interaction with the send element 314, the user interface manager 102 removes the thick border as shown around the message input element 308 in FIG. 3C, moves the message input element 308 closer to the electronic communication 306b within the communication thread 304, changes the background of the message input element 308 from stippled in FIG. 3C to black, changes the text color of the message input 309 from black in FIG. 3C to white, and adds a tail to the message input element 308 pointed in the same direction as the electronic communication 306a. In an alternative embodiment, the user interface manager 102 may also update the message input element 308 in response to a detected interaction with the send element 314 such that the message input element 308 is no longer selectable and such that message input 309 is no longer available for editing.

The user interface manager 102 may change various characteristics of the message input element 308 and the message input 309 so as to indicate the source of the message input element 308 and the message input 309. For example, as shown in FIG. 3D, the user interface manager 102 updates the message input element 308 and the message input 309 to be the same colors, orientation, and shape as the electronic communication 306a. As discussed above, the electronic communication 306a is an electronic communication send by the communication manager 106. In other words, the electronic communication 306a is an electronic communication composed on and sent from computing the device 300 via the UI organization system 100. Thus, a user can see at a glance that the last message in the communication thread 304 is a message sent from the computing device 300.

In one or more alternative embodiments, the user interface manager 102 may change various characteristics of the message input element 308 and the message input 309 in order to indicate a single social networking account. For example, a user may access a social networking account via one or more computing devices. In one or more embodiments, the user may compose and send a first set electronic messages in a communication session from a mobile phone logged onto a social networking account, and may compose and send a second set of electronic messages in the same communication session from a laptop computer. In one or more embodiments, the user interface manager 102 may display the message input element 308, the message input 309, and the electronic communication 306a with the same display characteristics even though the electronic communication 306a may have been sent from one computing device and the message input element 308 and the message input 309 may be have been sent from a different computing device.

In one or more alternative embodiments, once the user interface manager 102 changes various display characteristics of the message input element 308 and the message input 309 as described above, the user interface manager 102 may provide another message input element with a default message input (not shown in FIG. 3D) to the bottom of the communication thread 304, as shown in FIG. 3A. For example, the user interface manager 102 may provide a message input element with a default message input (i.e., "Type a message . . . ") in order to indicate that the user may begin composing a new message input. Also in one or more alternative embodiments, the user interface manager 102 may provide a message input element with a default message input in order to indicate that the communication manager 106 has successfully sent the previous message input to one or more co-users.

Figures 4A, 4B:
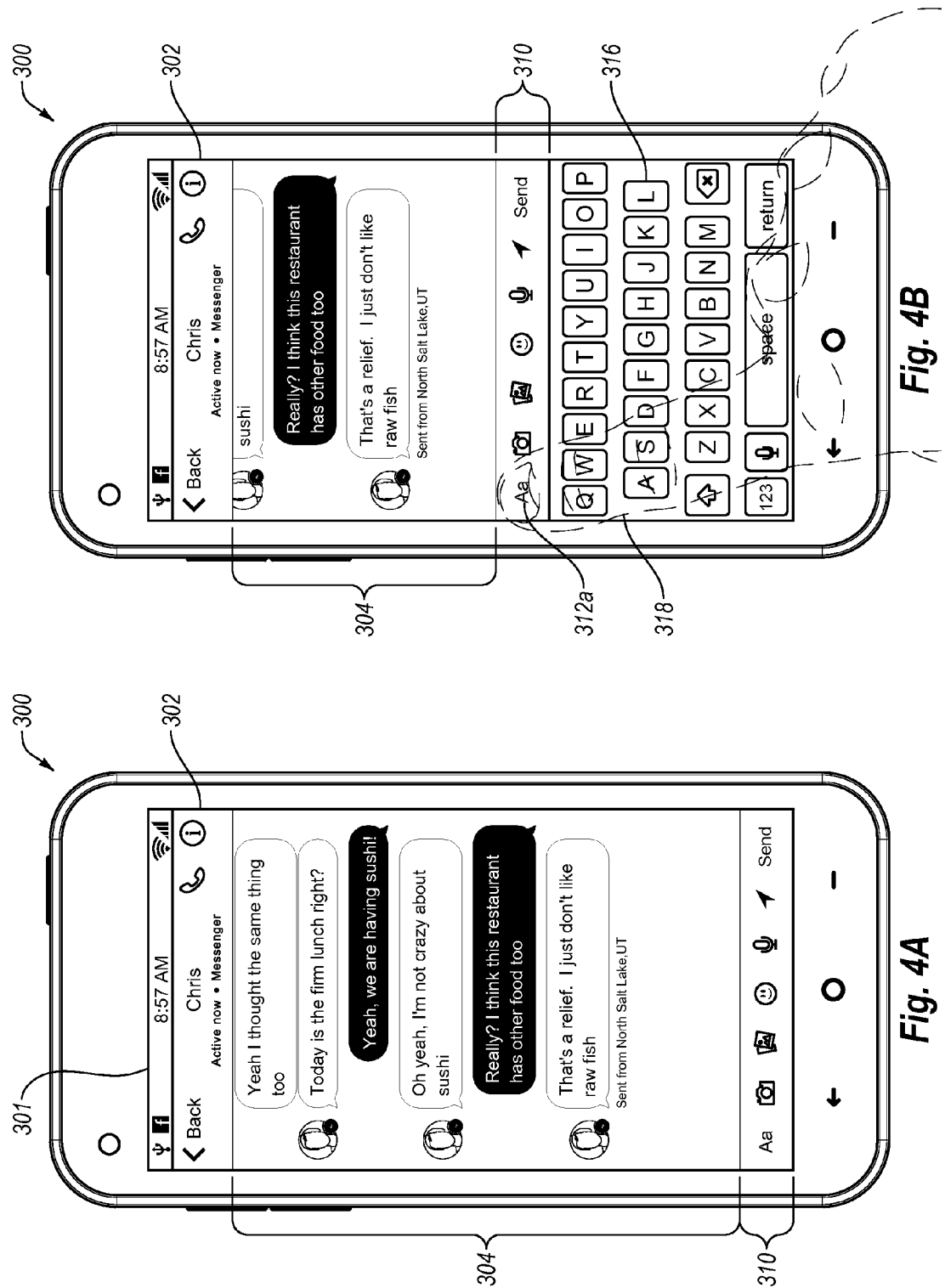

The UI organization system 100 may be implemented in alternative embodiments of systems and methods described herein. For example, FIGS. 4A-4E illustrate an alternative embodiment wherein the user interface manager 102 adds a message input element to a communication thread simply upon a user typing. For instance, as shown in FIG. 4A, the user interface manager 102 displays the communication thread 304 and the message input control palette 310 within the messaging graphical user interface 302 displayed on the touch screen display 301 of the computing device 300. Unlike FIG. 3A, in the present embodiment, the user interface manager 102 does not initially provide a message input element in the communication thread 304.

As described above, the user interface manager 102 may provide a touch screen display keyboard upon a detected user interaction with a message input control in the message input control palette 310. For example, as shown in FIG. 4B, a finger 318 of a user performs a touch gesture (i.e., a tap touch gesture) in conjunction with the text input control 312a within the message input control palette 310. In one or more embodiments, the user input detector 104 can detect the touch gesture and the user interface manager 102 can provide the touch screen display keyboard 316 in response to the detected touch gesture. In an alternative embodiment, the user interface manager 102 may provide the touch screen display keyboard 316 in response to other types of detected touch gestures. For example, in one or more alternative embodiments, the user interface manager 102 may provide the touch screen display keyboard 316 in response to a spoken command, a change in orientation of the computing device 300 (e.g., portrait to landscape), a swipe-up touch gesture from the bottom of the messaging graphical user interface 302, or in any other way that may be suitable for this purpose.

The message input element 308 may be selectively provided within the communication thread 304 as soon as a user begins typing a message input. For example, in FIG. 3A, the user interface manager 102 provides the message input element 308 within the communication thread 304 before the user input detector 104 detects a selection of the text input control 312a. However, in another embodiment and as shown in FIGS. 4A-4D, the user interface manager 102 may selectively provide the message input element 308 in response to detected user inputs via a touch screen display keyboard 316. In other words, the user interface manager 102 may selectively provide the message input element 308 in response to a user typing a message input. Thus, the user interface organization system 100 reduces user interface clutter and helps to ensure that more electronic communications 306a, 306b are viewable in the communication thread 304.

For example, as shown in FIG. 4C, the user input detector 104 detects the finger 318 of the user typing on the touch screen display keyboard 316 and the user interface manager 102 displays the message input element 308 in response to the detected typing. In one or more embodiments, the user interface manager 102 immediately displays every letter of the message input 309 within the message input element 308 as the finger 318 types it. In this way, a user may compose the message input 309 directly within the communication thread 304. As shown in FIG. 4C, the user has typed a partial message input 309, which reads, "That's under." In one or more alternative embodiments, the user interface organization system 100 may also include voice recognition capabilities. In a particular alternative embodiment, the user interface manager 102 may display words of the message input 309 within the message input element 308 as spoken by a user.

The user interface manager 102 may display the message input element 308 at various positions within the messaging graphical user interface 302 in order to signify that a user is composing a message input 309 and to further distinguish the message input element 308 from sent and received electronic communications 306a, 306b. For example, as shown in FIG. 4C, the user interface manager 102 displays the message input element 308 in the bottom-middle of the communication thread 304. In alternative embodiments, as shown in FIG. 3C, the user interface manager 102 may display the message input element 308 in the bottom-corner of the communication thread 304. In yet one or more alternative embodiments, the user interface manager 102 may display the message input element 308 in other various locations. For example, in an alternative embodiment, the user interface manager 102 may display the message input element 308 superimposed over the messaging graphical user interface 302 so as to appear like it is floating above the communication thread 304.

As described above with regard to FIGS. 3A-3D, the user interface manager 102 may continuously resize the message input element 308 so as to accommodate the message input 309 as a user is composing the message input 309. Likewise, as described above with regard to FIGS. 3A-3D, the user interface manager 102 may provide the message input element 308 with different characteristics from the electronic communications 306a, 306b while a user composes the message input 309. For example, as shown in FIG. 4C, the user interface manager 102 displays the message input element 308 with a broader border characteristic and a different background characteristic that those of the electronic communications 306a, 306b. In this way, a user may easily distinguish the message input element 308 from the electronic communications 306a, 306b.

As described above with regard to FIGS. 3C-3D, the communication manager 106 can send the message input 309 composed within the message input element 308 to one or more co-users in response to a detected user interaction with the send element 314. Additionally or alternatively, the communication manager 106 can send the message input 309 composed within the message input element 308 to the communication server 208, which in turn sends the message input 309 to one or more computing devices associated with one or more co-users. Also as described above with regard to FIGS. 3C-3D, the user interface manager 102 can change various display characteristics of the message input element 308 and the message input 309 in response to the detected user interaction with the send element 314. For example, as illustrated in FIG. 4D, the user input detector 104 detects a touch gesture (i.e., a tap touch gesture) performed by the finger 318 in conjunction with the send element 314, and reports the detected touch gesture to the communication manager 106 and the user interface manager 102.

In one or more embodiments, the user interface manager 102 may change the display position of the message input element 308 in response to a detected user interaction and the message input 309 being sent as a message. For example, as illustrated in FIGS. 4C and 4D, the user interface manager 102 provides the message input element 308 in FIG. 4C at the bottom-middle of the communication thread 304 and then changes the position of the message input element 308 in FIG. 4D to the side of the communication thread 304. Thus, the user interface manager 102 provides a user with a clear indication that the message has been sent.

Also as discussed above with regard to FIGS. 3C and 3D, the user interface manager 102 may also change other display characteristics of the message input element 308 and the message input 309 to indicate that the message input 309 has been sent as a message. For example, the user interface manager 102 may change the color, font, or shape of the message input element 308 and the message input 309. Further more, the user interface manager 102 may also update the message input element 308 such that it is no longer selectable or editable.

As discussed above, the user interface manager 102 may selectively remove display elements, which will be shown with regard to FIGS. 5A and 5B. For example, in FIG. 5A, the user interface manager 102 displays the messaging graphical user interface 302 after the message, "That's understandable" has been sent. Accordingly, in one or more embodiments, the user interface manager 102 may again display the message input element 308 with the invitation, "Type a message . . . " within the communication thread 304. Thus, while the user interface manager 102 displays the messaging graphical user interface 302 in this state, a user may input another message via the touch screen display keyboard 316.

Alternatively, the user may want to view a maximized portion of the communication thread 304 rather than compose another message. For example, as illustrated in FIG. 5B, the user interface manager 102 removes the message input element 308 and the touch screen display keyboard 316 (as shown in FIG. 5A) in response to a detected touch gesture. In one or more embodiments, the user input detector 104 may detect a touch gesture performed by the finger 318 of a user in conjunction with a message input control displayed in the message input control palette 310. In a particular embodiment, the user interface manager 102 may remove the message input element 308 and touch screen display keyboard 316 in response to a detected touch gesture including the text input control 312*a*.

In one or more embodiments, the user interface manager 102 may remove the message input element 308 and the touch screen display keyboard 316 in response to a detected touch gesture with another message input control that does not require text input (i.e., a recorded message). In one or more alternative embodiments, the user interface manager 102 may also replace the touch screen keyboard with another message input control (e.g., with a camera viewfinder, a recording control, a file select gallery, etc.) in response to the detected touch gesture. Thus, the user interface manager 102 may selectively remove and replace various message input controls in order to maintain optimal organization within the messaging graphical user interface 302.

Enabling the user interface manager 102 to selectively remove and/or replace display elements according to detected user interactions is advantageous for many reasons. First, the user interface manager 102 allows a maximum portion of the communication thread 304 to be viewed by a user when un-used display elements, such as the message input element 308 and touch screen display keyboard 316 are removed. Thus, in one or more embodiments, when the user interface manager 102 removes un-used display elements, a user may more easily discern the context of a communication session as well as where the communication session left off. Additionally advantageous is that the user interface manager 102 maintains optimal organization of the messaging graphical user interface 302 by providing the display elements that are actually being used.

Figure 6:
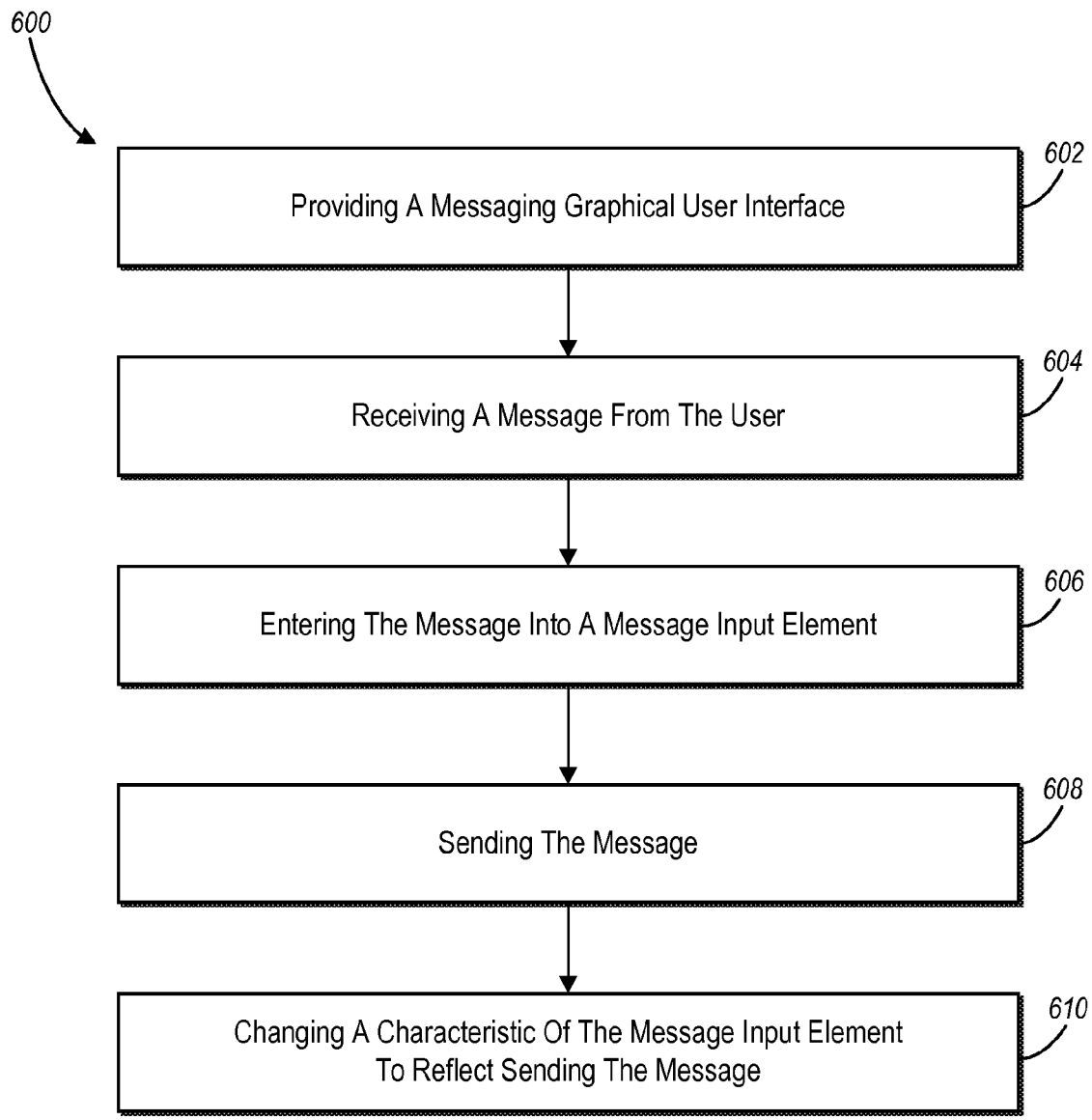
FIG. 6 illustrates a flowchart of a series of acts in a method of composing an electronic communication directly in a communication thread in accordance with one or more embodiments.
Figure 7:
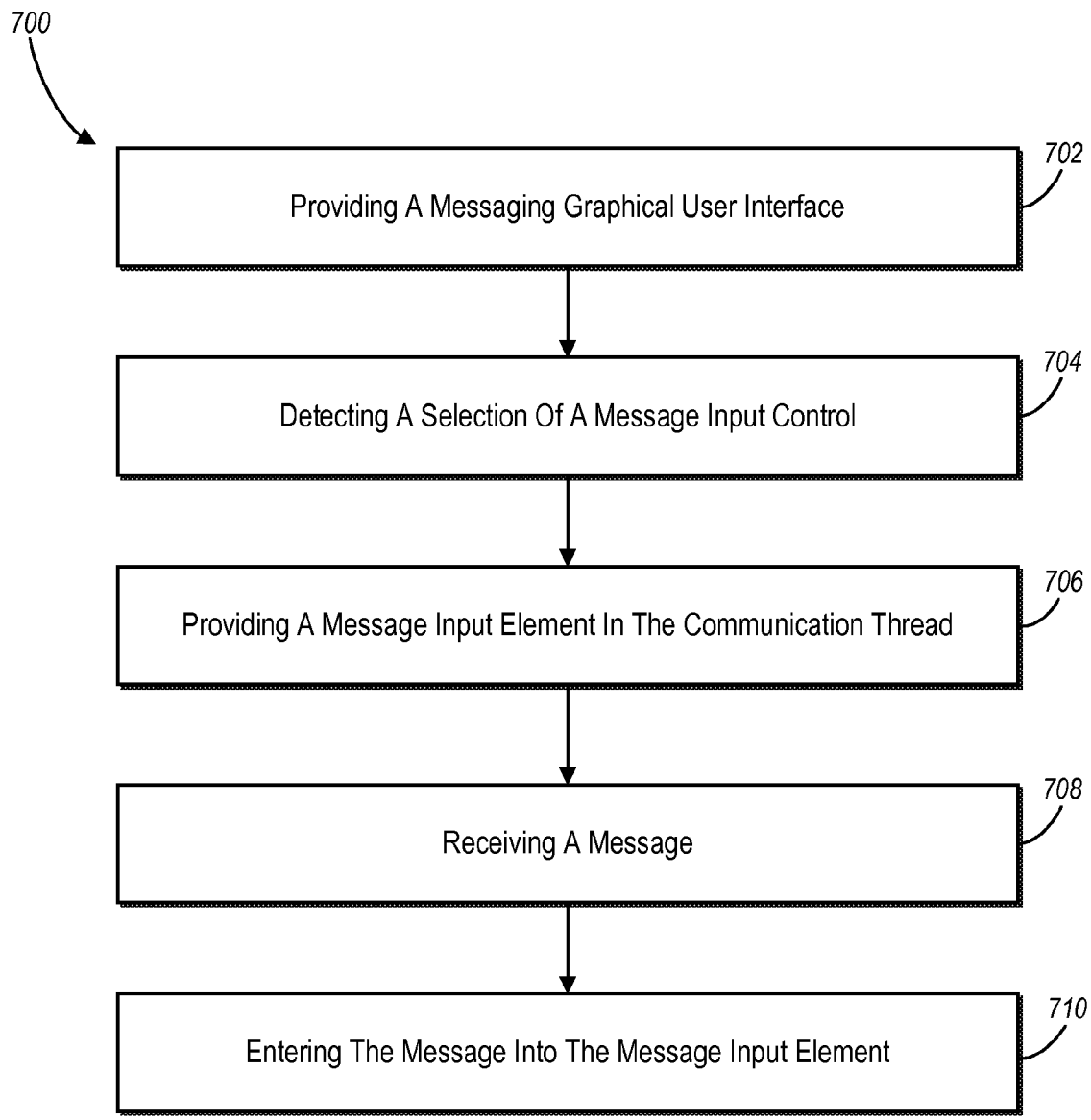
FIG. 7 illustrates a flowchart of a series of acts in another method of composing an electronic communication directly in a communication thread in accordance with one or more embodiments.

FIGS. 1-5B, the corresponding text, and the examples, provide a number of different systems and devices for organizing a graphical user interface of a communication system. In addition to the foregoing, embodiments can also be described in terms of flowcharts comprising acts and steps in a method for accomplishing a particular result. For example, FIGS. 6-7 illustrate flowcharts of exemplary methods in accordance with one or more embodiments. The methods described in relation to FIGS. 6-7 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of one example method 600 of composing an electronic communication directly in a communication thread. The method 600 includes an act 602 of providing a messaging graphical user interface. In particular, the act 602 can involve providing a messaging graphical user interface 302 comprising a communication thread 304. The communication thread can include a plurality of electronic messages 306*a*, 306*b* exchanged between a user and one or more co-users, and a message input element 308. In one or more embodiments, the act 602 of providing a message input element 308 can include providing the message input element 308 as a text bubble.

The method 600 further includes an act 604 of receiving a message from the user. In particular, the act 604 can involve receiving a message input from a user (e.g., "That's understandable" in FIGS. 3D and 4D). For example, the act 604 of receiving a message input 309 from the user may include receiving the message input 309 via a touch screen display keyboard 316. In one or more alternative embodiments, the act 604 of receiving a message input 309 from the user may include receiving the message input 309 via a keyboard, a mouse, a microphone, a camera, a track pad, or via a variety of other ways, as discussed above.

In addition, the method 600 further includes an act 606 of entering the message input into a message input element. In particular, the act 606 can involve entering the message input 309 into the message input element 308 in the communication thread 304. For example, the act 606 of entering the message input 309 into the message input element 308 can include simultaneously entering each character, word, and/or sentence typed by a user via a touch screen display keyboard 316 into the message input element 308 as it is typed. In one or more embodiments, the method 600 may further include providing a touch screen display keyboard 316 in response to a selection of the message input element 308 in the communication thread 304. Furthermore, in one or more embodiments, the method 600 may also include resizing the message input element 308 to accommodate the message input 309 via the touch screen display keyboard 316.

The method 600 also includes an act 608 of sending the message. In particular, the act 608 can involve sending the message input 309 entered into the message input element 308. For example, in one or more embodiments, the act 608 of sending the message may include sending the message input 309 entered into the message input element 308 to one or more co-users of the communication system.

The method 600 further includes an act 610 of changing a characteristic of the message input element to reflect sending the message. In particular, the act 610 can involve changing a characteristic of the message input element 308 in the communication thread 304 to reflect sending of the message input 309 entered into the message input element 308. In one or more embodiments, the act 610 of changing a characteristic of the message input element 308 in the communication thread 304 to reflect sending of the message input 309 entered into the message input element 308 can involve changing one or more of a color, a position, a size, a font, or an orientation of the message input element 308. Additionally or alternatively, the act 610 of changing a characteristic of the message input element 308 in the communication thread 304 to reflect sending of the message input entered into the message input element 308 can involve changing a horizontal position of the message input element 308 within the communication thread 304.

Additionally, the method 600 may further include changing the characteristic of the message input element 308 to reflect entering of the message input 309 into the message input element 308. For example, the method 600 including changing the characteristic of the message input element 308 to reflect entering of the message input 309 into the message input element 308 may include changing a color, position, size, font, or orientation of the message input element 308 and/or the message input 309 while a user is utilizing the touch screen display keyboard 316 to type the message input 309. More specifically, the method 600 may include changing the characteristic of the message input element 308 to reflect entering of the message input 309 into the message input element 308 by changing the message input element 308 from a first color to a second color. Additionally, the method 600 may also include changing the characteristic of the message input element 308 in the communication thread 304 to reflect sending of the message input 309 entered into the message input element 308 by changing the message input element 308 from the second color to a third color.

The method 600 may further include the step of detecting a selection of a message input control 312a-312e from a palette 310 of one or more message input controls. The method 600 can then include, in response to the selection of the message input control, removing the message input element 308 from the communication thread 304. For example, the method 600 can include detecting a selection of a message input control that is not indicative of a textual message input (i.e., not the text input control 312a), and removing the message input element 308 from the communication thread 304. In one or more embodiments, the method 600 of detecting a selection of a message input control can include detecting a photo input control 312b, a file input control 312c, a symbol input control 312d, or a recording input control 312e.

FIG. 7 illustrates a flowchart of a method 700 of composing an electronic communication directly in a communication thread. The method 700 includes an act 702 of providing a messaging graphical user interface. In particular, the act 702 can involve providing a messaging graphical user interface 302 comprising a communication thread 304. The communication thread 304 can include a plurality of electronic messages 306a, 306b exchanged between a user and one or more co-users. The messaging graphical user interface 302 further comprises a message input control area including a palette 310 of the one or more message input controls 312a-312e.

The method 700 further includes an act 704 of detecting a selection of a message input control. In particular, the act 704 can involve detecting a selection of a first message input control 312a from a palette 310 of one or more message input controls 312a-312e. In one or more embodiments, the method 700 can further include providing a touch screen display keyboard 316 in the messaging graphical user interface 302 in response to the selection of the first message input control 312a. For example, in one or more embodiments, the act 704 of detecting a selection of a first message input control may involve detecting a selection of the text input control 312a.

Additionally, the method 700 further includes an act 706 of providing a message input element in the communication thread. In particular, the act 706 can involve providing a message input element 308 in the communication thread 304 in response to the selection of the first message input control 312a. In one or more embodiments, the act 706 of providing a message input element 308 in the communication thread 304 can include providing a text bubble in the communication thread 304 and providing a cursor 319 in the text bubble.

The method 700 further includes an act 708 of receiving a message. In particular, the act 708 can involve receiving a message input 309. For example, the act 708 can include receiving a message input 309 typed by a user via the touch screen display keyboard 316. In one or more alternative embodiments, the act 708 can include receiving a message input 309 via a sound input, via a file selection, or via a camera input.

The method 700 further includes an act 710 of entering the message into the message input element. In particular, the act 710 can involve entering the message input 309 into the message input element 308 in the communication thread 304. For example, the act 708 can include entering a message input 309 into the message input element 308 as a user types the message via the touch screen display keyboard 316.

The method 700 may further include detecting a selection of a second messaging input control. In response to the selection of the second messaging input control, the method 700 may also include removing the message input element 308 from the communication thread 304, and removing the touch screen display keyboard 318 from the messaging graphical user interface 302. In one or more embodiments, the step of detecting a selection of a second messaging input can include detecting a selection of one or more of a photo input control 312b, a file input control 312c, a symbol input control 312d, or a recording input control 312e. Furthermore, the step of removing the message input element 308 form the communication thread 304 may involve removing a text bubble from the communication thread 304.

The method 700 may also further include sending the message input 309 entered into the message input element 308, and changing a characteristic of the message input element 308 in the communication thread 304 to reflect sending of the message input 309 entered into the message input element 308. In one or more embodiments, the step of changing a characteristic of the message input element 308 to reflect sending of the message input 309 entered into the message input element 308 can include changing one or more of a color, a position, a size, a font, or an orientation of the message input element 308. Additionally, in one or more embodiments, the step of sending the message input 309 entered into the message input element 308 may include sending the message input 309 to one or more co-users of the communication system.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
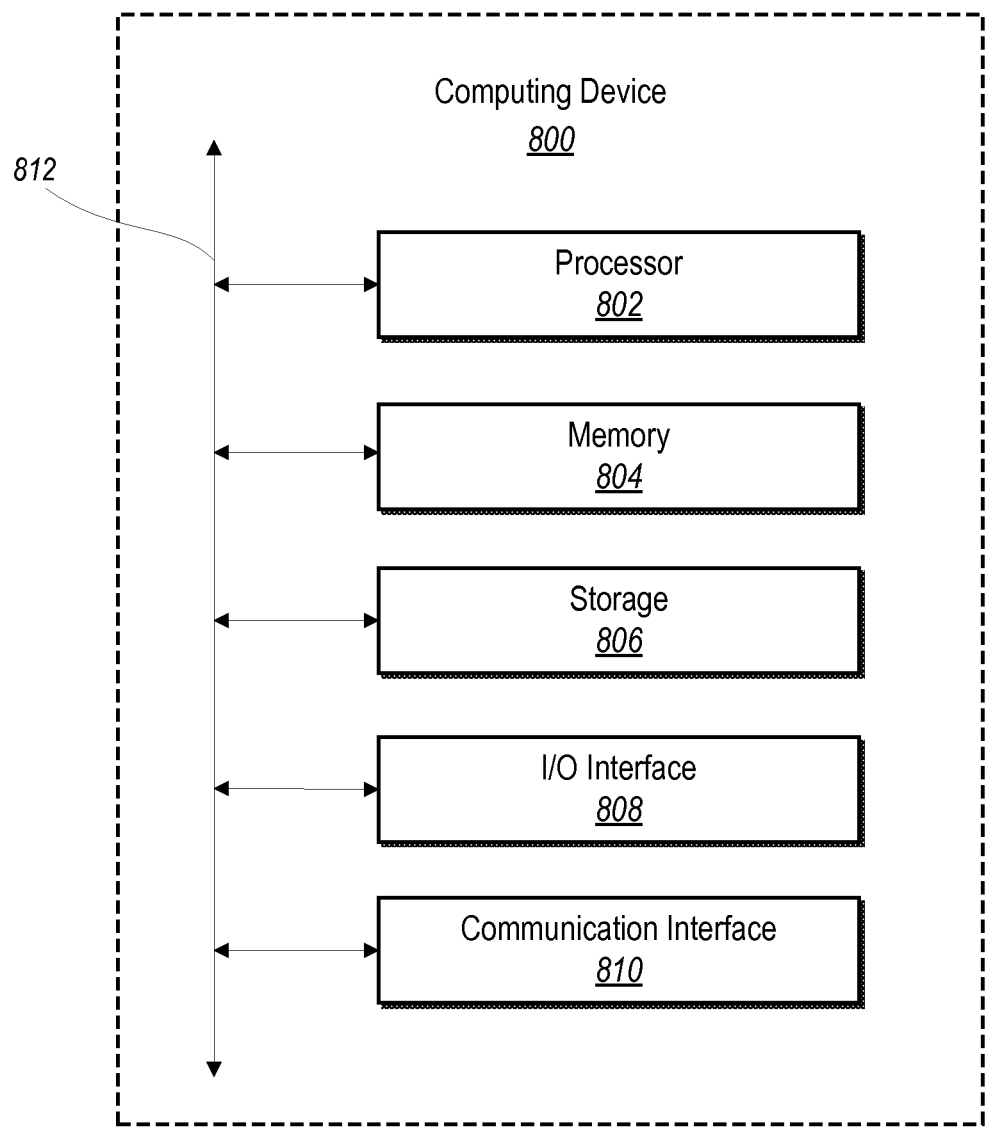
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that the UI organization system 100 may be implemented by one or more computing devices such as the computing device 800. For example, any of computing devices 202, 204, as shown in FIG. 2, and computing device 300, as shown in FIGS. 3A-5B may be a computing device 800. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In particular embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In particular embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In particular embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the network 206 and/or communication server 208 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 9:
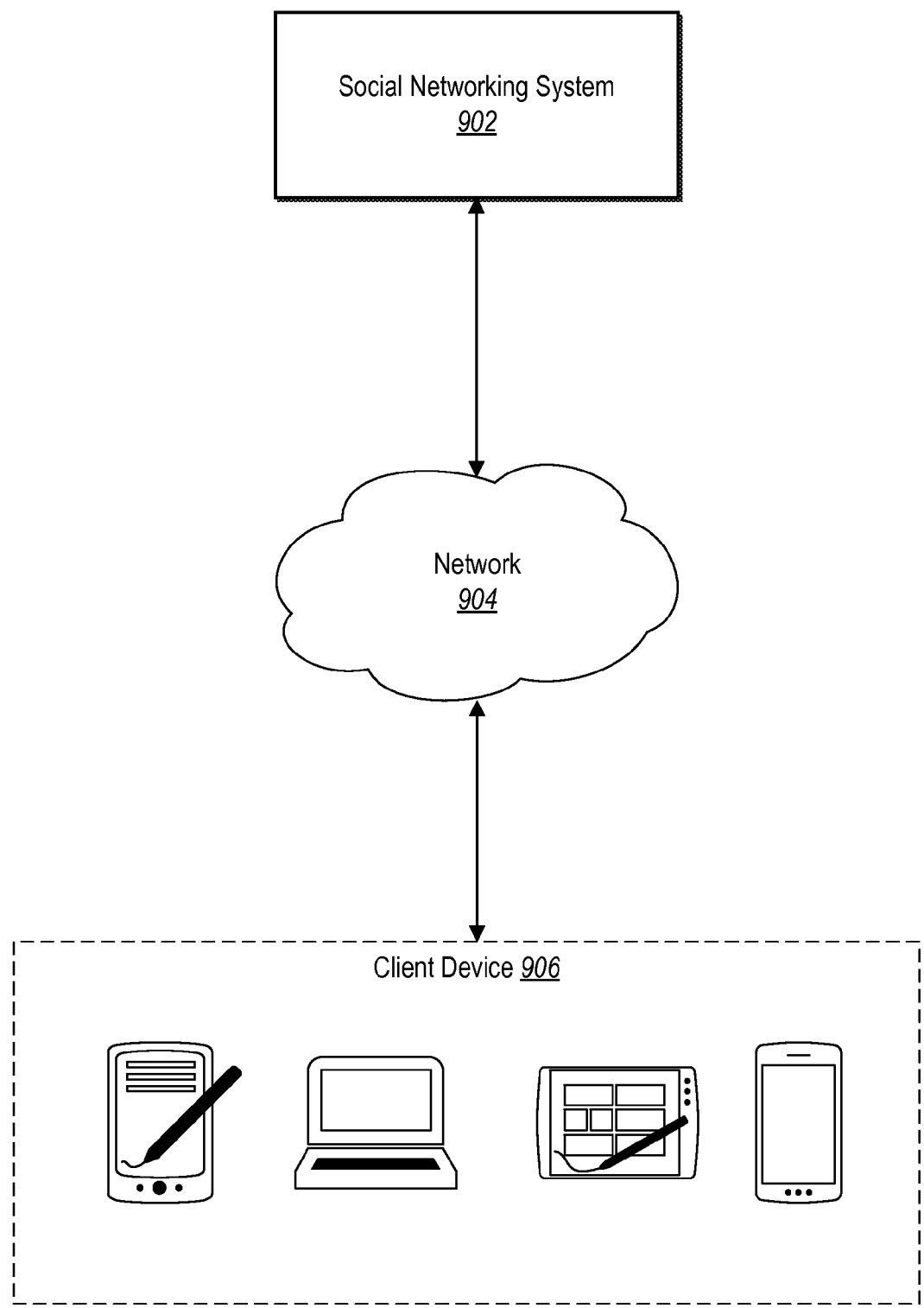
FIG. 9 is an example network environment of a social networking system in accordance with one or more embodiments.

FIG. 9 illustrates an example network environment of a social-networking system. In particular embodiments, a social-networking system 902 may comprise one or more data stores. In particular embodiments, the social-networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 902 may comprise one or more computing devices (e.g., servers) hosting functionality directed to operation of the social-networking system. A user of the social-networking system 902 may access the social-networking system 902 using a client device such as client device 906. In particular embodiments, the client device 906 can interact with the social-networking system 902 through a network 904.

The client device 906 may be a desktop computer, laptop computer, tablet computer, personal digital assistant (PDA), in- or out-of-car navigation system, smart phone or other cellular or mobile phone, or mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over a network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access the social-networking system 902.

While these methods, systems, and user interfaces utilize both publicly available information as well as information provided by users of the social-networking system, all use of such information is to be explicitly subject to all privacy settings of the involved users and the privacy policy of the social-networking system as a whole.

Various embodiments and aspects above are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system comprising:
    at least one processor; and
    at least one non-transitory computer-readable storage medium storing instructions thereon that, when executed by the at least one processor, cause the system to:
    provide a messaging graphical user interface comprising a communication thread comprising a plurality of electronic messages exchanged between a user and one or more co-users, and a message input control area; and
    detect a selection of a first message input control from the message input control area;
    in response to the selection of the first message input control, provide a touch screen display keyboard;
    receive a message input for a message via the touch screen display keyboard;
    in response to and while receiving the message input, provide a message input element positioned within the communication thread; and
    enter, by at least one processor and while receiving the message input, the message into the message input element in the communication thread.

2. The system as recited in claim 1, further comprising instructions that, when executed by the at least one processor, cause the system to resize, while receiving the message input, the message input element to accommodate an increasing size of the message.

3. The system as recited in claim 1, wherein the message input element comprises a text bubble.

4. The system as recited in claim 1, further comprising instructions that, when executed by the at least one processor, cause the system to change a characteristic of the message input element to reflect sending of the message entered into the message input element, wherein changing a characteristic of the message input element comprises changing one or more of a color, a position, a size, a font, or an orientation of the message input element.

5. The system as recited in claim 4, further comprising instructions that, when executed by the at least one processor, cause the system to change the characteristic of the message input element to reflect entering of the message into the message input element.

6. The system as recited in claim 5, wherein:
    changing the characteristic of the message input element to reflect entering of the message into the message input element comprises changing the message input element from a first color to a second color; and
    changing the characteristic of the message input element in the communication thread to reflect sending of the message entered into the message input element comprises changing the message input element from the second color to a third color.

7. The system as recited in claim 4, wherein changing the characteristic of the message input element further comprises converting the message input element to a message within the communication thread.

8. The system as recited in claim 1, further comprising instructions that, when executed by the at least one processor, cause the system to remove the touch screen display keyboard in response to a selection of a second message input control from the message input control area.

9. The system as recited in claim 1, further comprising instructions that, when executed by the at least one processor, cause the system to:
    detect, prior to sending the message entered into the message input element, a selection of a first second message input control from the message input control area;
    in response to the selection of the second message input control, remove the message input element from the communication thread.

10. The system as recited in claim 9, wherein the second message input control comprises one or more of a photo input control, a file input control, a symbol input control, or a recording input control.

11. A method comprising:
    providing a messaging graphical user interface comprising:
    a communication thread comprising a plurality of electronic messages exchanged between a user and one or more co-users; and
    a message input control area comprising a palette of one or more message input controls;
    detecting a selection of a first message input control from the palette of one or more message input controls;
    in response to the selection of the first message input control, providing a touch screen display keyboard;
    receiving, via the touch screen display keyboard, a message input for a message from the user;
    providing, in response to and while receiving the message input, a message input element in the communication thread; and
    entering, by at least one processor and while receiving the message input, the message into the message input element in the communication thread.

12. The method as recited in claim 11, further comprising removing the touch screen display keyboard from the messaging graphical user interface and the message input element from the communication thread in response to the selection of a second message input control.

13. The method as recited in claim 12, further comprising:
    detecting, after removing the touch screen keyboard and the message input element, a selection of the first messaging input control; and
    in response to the selection of the first messaging input control:

providing the message input element from the communication thread containing the message, and providing the touch screen display keyboard within the messaging graphical user interface.

14. The method as recited in claim 13, wherein the second message input control comprises one or more of a photo input control, a file input control, a symbol input control, or a recording input control.

15. The method as recited in claim 12, wherein the message input element comprises a text bubble.

16. The method as recited in claim 11, further comprising:
sending the message entered into the message input element; and
changing a characteristic of the message input element in the communication thread to reflect sending of the message entered into the message input element.

17. The method as recited in claim 16, wherein changing a characteristic of the message input element to reflect sending of the message entered into the message input element comprises converting the message input element to a message the message within the communication thread.

18. A non-transitory computer readable storage medium having stored thereon computer-executable instructions that, when executed by a processor, cause a computer system to:
provide a messaging graphical user interface comprising a communication thread comprising a plurality of electronic messages exchanged between a user and one or more co-users, and a message input control area;
detect a selection of a first message input control from the message input control area;
in response to the selection of the first message input control, provide a touch screen display keyboard;
receive a message input for a message via the touch screen display keyboard;
in response to and while receiving the message input, provide a message input element positioned within the communication thread; and
enter, while receiving the message input, the message into the message input element in the communication thread.

19. The non-transitory computer readable storage medium as recited in claim 18, further comprising computer-executable instructions that, when executed by the processor, cause the computer system to:
resize, while receiving the message input, the message input element to accommodate an increasing size of the message;
send the message entered into the message input element; and
change, in response to sending the message, a characteristic of the message input element to add the message to the communication thread.

20. The non-transitory computer readable storage medium as recited in claim 19, further comprising computer-executable instructions that, when executed by the processor, cause the computer system to:
change the characteristic of the message input element by changing the messaging input element from a first color to a second color.

* * * * *